(12) United States Patent
Wakasa et al.

(10) Patent No.: US 11,531,853 B2
(45) Date of Patent: Dec. 20, 2022

(54) PRINTING DEVICE AND CONTROL METHOD FOR PRINTING DEVICE

(71) Applicant: SEIKO EPSON CORPORATION, Tokyo (JP)

(72) Inventors: Shunichi Wakasa, Chikuma (JP); Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/146,634

(22) Filed: Jan. 12, 2021

(65) Prior Publication Data

US 2021/0216834 A1  Jul. 15, 2021

(30) Foreign Application Priority Data

Jan. 15, 2020  (JP) .............................. JP2020-004310

(51) Int. Cl.
*G06K 15/02* (2006.01)
*G06F 3/12* (2006.01)

(52) U.S. Cl.
CPC ..... *G06K 15/1802* (2013.01); *G06K 15/1806* (2013.01)

(58) Field of Classification Search
None
See application file for complete search history.

(56) References Cited

U.S. PATENT DOCUMENTS

| | | | | |
|---|---|---|---|---|
| 5,734,388 A | * | 3/1998 | Ristow | G06K 15/02 345/469 |
| 5,825,987 A | * | 10/1998 | Asada | G06K 15/02 358/1.11 |
| 6,246,976 B1 | * | 6/2001 | Mukaigawa | G06F 40/126 704/9 |
| 6,826,728 B1 | * | 11/2004 | Horiyama | G09G 5/24 345/171 |
| 7,583,393 B2 | * | 9/2009 | Hodder | G06K 15/02 345/467 |
| 2007/0176802 A1 | * | 8/2007 | Fay | G06F 40/129 341/50 |
| 2007/0177206 A1 | * | 8/2007 | Miyazawa | G06F 3/1208 358/1.15 |
| 2008/0079730 A1 | * | 4/2008 | Zhang | G06F 40/126 345/468 |
| 2016/0092439 A1 | * | 3/2016 | Ichimi | G06F 40/109 715/265 |

FOREIGN PATENT DOCUMENTS

| | | | | |
|---|---|---|---|---|
| JP | 60179261 | * | 9/1985 | G06F 3/12 |
| JP | H0691956 | * | 4/1994 | B41J 5/44 |
| JP | H07112553 | * | 5/1995 | G06F 3/12 |

(Continued)

*Primary Examiner* — Beniyam Menberu
(74) *Attorney, Agent, or Firm* — Workman Nydegger (57) ABSTRACT

A printing device includes: a printing unit performing printing; and a control unit that, when accepting a character code associated with a plurality of font designs, causes the printing unit to print a character indicated by the character code, based on a priority level allocated to each of the plurality of font designs. The control unit changes the priority level of the plurality of font designs in response to a first command that is accepted. The first command is a command indicating the priority level of the font design that is a part of the plurality of font designs.

6 Claims, 5 Drawing Sheets

(56) References Cited

FOREIGN PATENT DOCUMENTS

| JP | H09179699 | * | 7/1997 | ............... G06F 3/12 |
| JP | 2011210045 | * | 10/2011 | ............... G06F 3/12 |
| JP | 4808220 | * | 11/2011 | ........... G06T 11/203 |
| JP | 2019-20892 A | | 2/2019 | |
| JP | 2019020892 | * | 2/2019 | ............... G06F 3/12 |
| JP | 2020003605 | * | 1/2020 | ............... B41J 29/42 |

* cited by examiner

| CODE POINT | CHINESE CHARACTER IN EAST ASIAN GOTHIC TYPEFACE IN JAPANESE-SPEAKING AREA | SIMPLIFIED CHINESE CHARACTER IN MINCHO TYPEFACE IN CHINESE-SPEAKING AREA | TRADITIONAL CHINESE CHARACTER IN MINCHO TYPEFACE IN CHINESE-SPEAKING AREA | CHINESE CHARACTER IN EAST ASIAN GOTHIC TYPEFACE IN KOREAN-SPEAKING AREA |
|---|---|---|---|---|
| U+9AA8 | 骨 | 骨 | 骨 | 骨 |
| U+6B21 | 次 | 次 | 次 | 次 |
| U+3042 | あ | あ | | あ |
| | K1 | K2 | K3 | K4 |

| VARIABLE DESIGNATING FONT DESIGN | FONT DESIGN | |
| --- | --- | --- |
| | CHARACTER FORM CORRESPONDING TO COUNTRY OR REGION | TYPEFACE |
| xxx1 | ANK CHARACTER | SAN-SERIF |
| xxx2 | CHINESE CHARACTER IN JAPANESE-SPEAKING AREA | MINCHO |
| xxx3 | CHINESE CHARACTER IN JAPANESE-SPEAKING AREA | EAST ASIAN GOTHIC |
| xxx4 | SIMPLIFIED CHINESE CHARACTER IN CHINESE-SPEAKING AREA | MINCHO |
| xxx5 | TRADITIONAL CHINESE CHARACTER IN CHINESE-SPEAKING AREA | MINCHO |
| xxx6 | CHINESE CHARACTER IN KOREAN-SPEAKING AREA | EAST ASIAN GOTHIC |
| ... | ... | ... |

FIG. 6

| VARIABLE DESIGNATING FONT DESIGN | FONT DESIGN | |
| --- | --- | --- |
| | CHARACTER FORM CORRESPONDING TO COUNTRY OR REGION | TYPEFACE |
| xxx1 | ANK CHARACTER | SAN-SERIF |
| xxx4 | SIMPLIFIED CHINESE CHARACTER IN CHINESE-SPEAKING AREA | MINCHO |
| xxx2 | CHINESE CHARACTER IN JAPANESE-SPEAKING AREA | MINCHO |
| xxx3 | CHINESE CHARACTER IN JAPANESE-SPEAKING AREA | EAST ASIAN GOTHIC |
| xxx5 | TRADITIONAL CHINESE CHARACTER IN CHINESE-SPEAKING AREA | MINCHO |
| xxx6 | CHINESE CHARACTER IN KOREAN-SPEAKING AREA | EAST ASIAN GOTHIC |
| ... | ... | ... |

*FIG. 7*

```
7. Character/Font Settings
 7.6. Font Priority

Modes
  0:Return to the previous menu
  -:ANK
]*1:Japanese
  2:Korean
  3:Traditional Chinese
  4:Simplified Chinese ] means default value.
* means current set value.
```

PRINTING DEVICE AND CONTROL METHOD FOR PRINTING DEVICE

The present application is based on, and claims priority from JP Application Serial Number 2020-004310, filed Jan. 15, 2020, the disclosure of which is hereby incorporated by reference herein in its entirety.

BACKGROUND

1. Technical Field

The present disclosure relates to a printing device and a control method for a printing device.

2. Related Art

Research and development have been conducted on a printing device that can print a multiple-form character. The multiple-form character is a character having a plurality of font designs corresponding to countries or regions. The font design is, for example, a character form or the like.

In connection with this, a printing device that allocates a priority level to each of all the font designs of a multiple-form character at a time, based on a command accepted from a user, is known, for example, as disclosed in JP-A-2019-020892.

When printing a multiple-form character, the printing device as described in JP-A-2019-020892 prints the multiple-form character with a font design having the highest priority level, based on the priority level allocated to each of all the font designs of the multiple-form character.

However, the printing device as described in JP-A-2019-020892 allocates a priority level to each of all the font designs of a multiple-form character at a time, as described above. Thus, the user of this printing device must decide a priority level to allocate to each of all the font designs of a multiple-form character and therefore needs to have knowledge about each of all the font designs. For example, the user needs to grasp types of font designs that are available in the printing device. For such reasons, in some cases, it is difficult for the printing device to readily change the priority level of a font design desired by the user from among all the font designs of a multiple-form character.

SUMMARY

In order to solve the foregoing problem, an aspect of the present disclosure is directed to a printing device including: a printing unit performing printing; and a control unit that, when accepting a character code associated with a plurality of font designs, causes the printing unit to print a character indicated by the character code, based on a priority level allocated to each of the plurality of font designs. The control unit changes the priority level of the plurality of font designs in response to a first command that is accepted. The first command is a command indicating the priority level of the font design that is a part of the plurality of font designs.

Also, in order to solve the foregoing problem, another aspect of the present disclosure is directed to a control method for a printing device including: when accepting a character code associated with a plurality of font designs, causing a printing unit performing printing to print a character indicated by the character code, based on a priority level allocated to each of the plurality of font designs; and changing the priority level of the plurality of font designs in response to a first command that is accepted. The first command is a command indicating the priority level of the font design that is a part of the plurality of font designs.

DESCRIPTION OF EXEMPLARY EMBODIMENTS

Embodiment

An embodiment of the present disclosure will now be described with reference to the drawings.

In the description below, for the sake of convenience of the description, any character expressed using 1 byte is referred to as a 1-byte character. The 1-byte character is, for example, an ANK (alphabet, numeric, kana) character. The ANK character is a character including one or both of an alphabetic character and a numeral expressed using 1 byte. That is, the ANK character is an alphanumeric character. The ANK character may also be configured to include another character expressed using 1 byte such as a katakana character expressed using 1 bytes, instead of one or both of an alphabetic character and a numeral expressed using 1 byte. The ANK character may also be configured to include this another character in addition to both of an alphabetic character and a numeral expressed using 1 byte. The alphabetic character expressed using 1 byte is, for example, a halfwidth alphabetic character. The numeral expressed using 1 byte is, for example, a halfwidth numeral. The katakana character expressed using 1 byte is, for example, a halfwidth kana character.

In the description below, for the sake of convenience of the description, any character expressed using 2 bytes is referred to as a 2-byte character. The 2-byte character is, for example, a Chinese character, a traditional Chinese character, a simplified Chinese character, a Hangul character or the like. The 2-byte character may also be configured to include another character expressed using 2 bytes, instead of a part or all of a Chinese character, a traditional Chinese character, a simplified Chinese character, and a Hangul character. The 2-byte character may also be configured to include another character expressed using 2 bytes, in addition to all of a Chinese character, a traditional Chinese character, a simplified Chinese character, and a Hangul character.

In the description below, for the sake of convenience of the description, any character that need not be distinguished as a 1-byte character or a 2-byte character is referred to as a printable character. The printable character includes a multiple-form character and a single-form character. The multiple-form character is a character having a plurality of font designs corresponding to countries or regions. In other words, the multiple-form character is a character expressed with each of the plurality of font designs. The font design is one of a character form, a typeface, and a combination of a character form and a typeface. In the description below, a case where the font design is a combination of a character form and a typeface is described. For example, the multiple-form character is included in Chinese characters in the Mincho typeface in the Japanese-speaking area, Chinese characters in the East Asian Gothic typeface in the Japanese-speaking area, simplified Chinese characters in the Mincho typeface in the Chinese-speaking area, traditional Chinese characters in the Mincho typeface in the Chinese-speaking area, Chinese characters in the East Asian Gothic typeface in the Korean-speaking area, or the like. In this way, in this case, a plurality of font designs of a multiple-form character include character forms corresponding to two or more languages, respectively. Even when the font design is the character form, a plurality of font designs of a multiple-form character include character forms corresponding to two or more languages, respectively. In this case, the multiple-form character is included, for example, in Chinese characters in the Japanese-speaking area, simplified Chinese characters in the Chinese-speaking area, traditional Chinese characters in the Chinese-speaking area, Chinese characters in the Korean-speaking area, or the like. The single-form character is a character having a single font design. In other words, the single-form character is a character expressed with a single font design.

Configuration of Printing System

Figure 1:
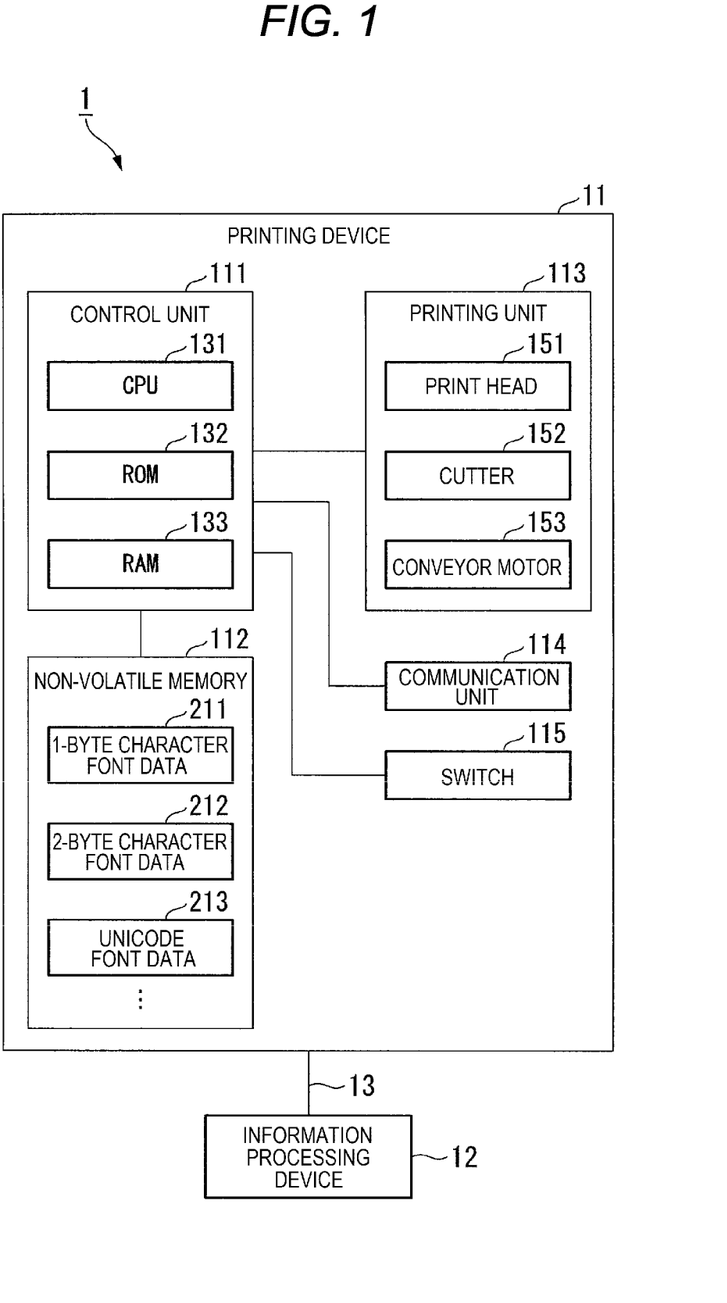
FIG. 1 shows an example of a configuration of a printing system 1 according to an embodiment.

The configuration of a printing system 1 according to the embodiment will now be described with reference to FIG. 1. FIG. 1 shows an example of the configuration of the printing system 1 according to the embodiment.

The printing system 1 has a printing device 11 and an information processing device 12.

The printing device 11 is communicatively coupled to the information processing device 12 via a wired or wireless line 13. The line 13 may be, for example, a network line. The network may be the internet.

In this embodiment, to simplify the description, one printing device 11 and one information processing device 12 are illustrated. However, for example, a plurality of information processing devices 12 may be coupled to one printing device 11. Also, for example, a plurality of printing devices 11 may be coupled to one information processing device 12.

In this way, the printing system 1 may have any number of printing devices 11 and any number of information processing devices 12. The devices provided in the printing system 1 may be placed in any arrangement.

The information processing device 12 communicates with the printing device 11 and transmits an encoding scheme designation command. The encoding scheme designation command is a command designating, to the printing device 11, an encoding scheme to be used by the printing device 11 in order to specify a character indicated by a character code received by the printing device 11.

For example, when specifying a 1-byte character indicated by a 1-byte character code, the printing device 11 uses a 1-byte character encoding scheme to specify the 1-byte character indicated by the 1-byte character code. The 1-byte character encoding scheme is an encoding scheme where a 1-byte character code and a 1-byte character are associated with each other, for example, ASCII or the like. That is, a 1-byte character code configured based on the 1-byte character encoding scheme is, for example, an ASCII character code or the like. Meanwhile, for example, when specifying a 2-byte character indicated by a 2-byte character code, the printing device 11 uses a 2-byte character encoding scheme to specify the 2-byte character indicated by the 2-byte character code. The 2-byte character encoding scheme is an encoding scheme where a 2-byte character code and a 2-byte character are associated with each other. The 2-byte character encoding scheme is, for example, ISO-2022-JP, Shift-_JIS, EUC-JP or the like. That is, a 2-byte character code configured based on the 2-byte character encoding scheme is, for example, an ISO-2022-JP, Shift_JIS, or EUC-JP character code, or the like. Also, for example, when specifying a character indicated by a code point, the printing device 11 uses Unicode to specify the character indicated by the code point. Unicode may also be referred to as UTF-8. Details of Unicode are defined as an International Standard and therefore will not be described here.

Figure 2:
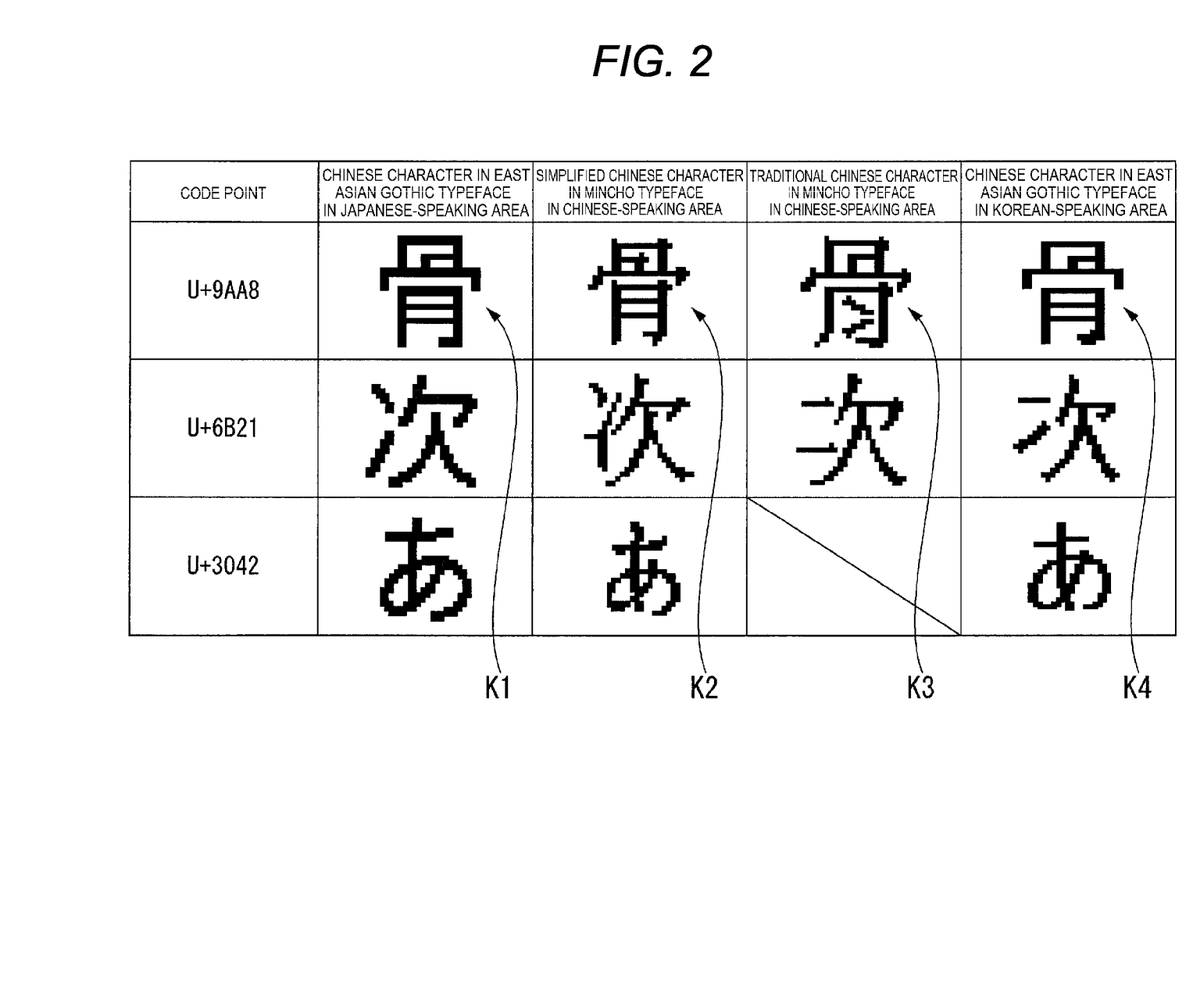
FIG. 2 shows an example of a relationship between a code point indicating a multiple-form character and the multiple-form character expressed with a plurality of font designs of the multiple-form character.

In Unicode, each individual single-form character is indicated by one code point. However, in Unicode, each individual multiple-form character, too, is indicated by one code point. Therefore, in Unicode, as shown in FIG. 2, a code point indicating a multiple-form character cannot distinguish a plurality of font designs of the multiple-form character. FIG. 2 shows an example of the relationship between a code point indicating a multiple-form character and the multiple-form character expressed with each of a plurality of font designs of the multiple-form character. A code point "U+9AA8" shown in FIG. 2 is a code point associated with a Chinese character K1 "骨" in the East Asian Gothic typeface in the Japanese-speaking area. However, in the Chinese-speaking area, the Chinese character K1 may be drawn in the form of a simplified Chinese character K2 in the Mincho typeface. In the Chinese-speaking area, the Chinese character K1 may also be drawn in the form of a traditional Chinese character K3 in the Mincho typeface. In the Korean-speaking area, the Chinese character K1 may be drawn in the form of a Chinese character K4 in the East Asian Gothic typeface. For these reasons, the code point "U+9AA8" is associated with each of the simplified Chinese character K2 in the Mincho typeface in the Chinese-speaking area corresponding to the Chinese character K1, the traditional Chinese character K3 in the Mincho typeface in the Chinese-speaking area corresponding to the Chinese character K1, and the Chinese character K4 in the East Asian Gothic typeface in the Korean-speaking area. Each of the code point "U+6B21" and the code points "U+3042" shown in FIG. 2 is associated with a multiple-form character expressed with each of a plurality of font designs, like the code point "U+9AA8". In this way, in Unicode, a code point cannot distinguish a plurality of font designs of a multiple-form character.

A priority level is allocated to each of all the font designs that are available in the printing device 11. In the printing device 11, a predetermined priority level is allocated by default to each of all the font designs. However, the printing device 11 can change the priority level of a font design desired by the user from among all the font designs to a desired priority level in response to a level change command accepted from the user or an operation accepted from the user. In the description below, an example case where the printing device 11 changes the priority level of a font design desired by the user from among all the font designs to a desired font design in response to a level change command accepted from the user is described.

The information processing device 12 communicates with the printing device 11 and transmits a print instruction to the printing device 11.

The print instruction includes a character code indicating a printable character to be a print target. For example, an instruction to print a 1-byte character includes a 1-byte character code indicating the 1-byte character or a code point indicating the 1-byte character. Also, for example, an instruction to print a 2-byte character includes a 2-byte character code indicating the 2-byte character or a code point indicating the 2-byte character. For example, when the printing device 11 has accepted a print instruction including a code point indicating a multiple-form character, the printing device 11 prints the multiple-form character with a font design having the highest priority level of a plurality of font designs of the multiple-form character. For example, when the plurality of font designs of the multiple-form character are the three font designs of the Chinese character in the East Asian Gothic typeface in the Japanese-speaking area, the simplified Chinese character in the Mincho typeface in the Chinese-speaking area, and the traditional Chinese character in the Mincho typeface in the Chinese-speaking area, and the priority level of the Chinese character in the East Asian Gothic typeface in the Japanese-speaking area is 1, the priority level of the simplified Chinese character in the Mincho typeface in the Chinese-speaking area is 2, and the priority level of the traditional Chinese character in the Mincho typeface in the Chinese-speaking area is 3, the printing device 11 prints the multiple-form character in the form of the Chinese character in the East Asian Gothic typeface in the Japanese-speaking area. Meanwhile, when the plurality of font designs of the multiple-form character are the three font designs of the Chinese character in the East Asian Gothic typeface in the Japanese-speaking area, the simplified Chinese character in the Mincho typeface in the Chinese-speaking area, and the traditional Chinese character in the Mincho typeface in the Chinese-speaking area, and the priority level of the Chinese character in the East Asian Gothic typeface in the Japanese-speaking area is 3, the priority level of the simplified Chinese character in the Mincho typeface in the Chinese-speaking area is 2, and the priority level of the traditional Chinese character in the Mincho typeface in the Chinese-speaking area is 5, the printing device 11 prints the multiple-form character in the form of the simplified Chinese character in the Mincho typeface in the Chinese-speaking area. The print instruction may also include other information.

The information processing device 12 may be any device, for example, a personal computer, smartphone or the like.

The information processing device 12 is operated by a user, not illustrated, and executes processing corresponding to the operation carried out by the user. The information processing device 12 may also be configured to automatically execute predetermined processing.

The printing device 11 has a control unit (controller) 111, a non-volatile memory 112, a printing unit (print mechanism) 113, a communication unit (communicator, communication mechanism) 114, and a switch 115.

The control unit 111 has a CPU (central processing unit, processor) 131, a ROM (read-only memory) 132, and a RAM (random-access memory) 133. The control unit 111 may also have another control circuit or the like.

The printing unit 113 has a print head 151, a cutter 152, and a conveyor motor 153.

In the non-volatile memory 112, 1-byte character font data 211, 2-byte character font data 212, and Unicode font data 213 are stored.

Here, font data is actual data representing a character in a form that is printable on a print medium, for example, bitmap font data. A 1-byte character code address table, a 2-byte character code address table, and a code point address table are stored in the ROM 132, described later. The 1-byte character code address table is a table showing the address on the non-volatile memory 112, of bitmap font data associated with each 1-byte character code. The 2-byte character code address table is a table showing the address on the non-volatile memory 112, of bitmap font data associated with each 2-byte character code. The code point address table is a table showing the address on the non-volatile memory 112, of bitmap font data associated with each code point.

That is, the 1-byte character font data 211 is bitmap font data representing a 1-byte character in a form that is printable on a print medium. Data received by the communication unit 114 is stored into the RAM 133 (receiving buffer) in the order in which the data is received by the communication unit 114. The control unit 111 reads out the data from the RAM 133 in the order in which the data is received by the communication unit 114. When the read-out data is a 1-byte character code, the control unit 111 refers to the ROM 132, based on the 1-byte character code, then acquires the address on the non-volatile memory 112 of the 1-byte character code with reference to the 1-byte character code address table, and reads out target bitmap font data from the 1-byte character font data 211, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

The 2-byte character font data 212 is bitmap font data representing a 2-byte character in a form that is printable on a print medium. When the read-out data is a 2-byte character code, the control unit 111 refers to the ROM 132, based on the 2-byte character code, then acquires the address on the non-volatile memory 112 of the 2-byte character code with reference to the 2-byte character code address table, and reads out target bitmap font data from the 2-byte character font data 212, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

The Unicode font data 213 is bitmap font data representing a character indicated by a code point in a form that is printable on a print medium. When the read-out data is a code point, the control unit 111 refers to the ROM 132, based on the code point, then acquires the address on the non-volatile memory 112 of the code point with reference to the code point address table, and reads out target bitmap font data from the Unicode font data 213, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

In this embodiment, the three types of font data stored in the non-volatile memory 112 are stored into the non-volatile memory 112 before the shipping of the printing device 11. Also, new font data may be stored into the non-volatile memory 112, for example, after the shipping of the printing device 11. The font data stored in the non-volatile memory 112 may be, for example, rewritten, deleted or the like after the shipping of the printing device 11.

When the Unicode font data 213 can be included in the 1-byte character font data 211 and the 2-byte character font data 212, the non-volatile memory 112 may be configured not to store the Unicode font data 213. In this case, for example, the ROM 132 has a table for converting each code point into a corresponding character code. When the control unit 111 has received a code point, the control unit 111 refers to this table, converts the code point into the character code corresponding to the code point, acquires the address on the non-volatile memory 112 of the character code, and reads out target bitmap font data from the 1-byte character font data 211 or the 2-byte character font data 212, based on the acquired address.

The control unit 111 controls each part of the printing device 11.

The ROM 132 stores a control program executed by the CPU 131 and various data in a non-volatile manner.

The RAM 133 functions as a work area for the CPU 131 and temporarily stores various data.

The CPU 131 reads out and executes the control program or the like stored in the ROM 132 and thus controls each part of the printing device 11.

The non-volatile memory 112 has, for example, a storage medium such as a semiconductor memory element like an EEPROM (electrically erasable programmable read-only memory) or flash memory, a hard disk, or the like, and stores various data in a rewritable and non-volatile manner.

Generally, a non-volatile memory retains data stored therein even when power is not supplied. Generally, a volatile memory does not retain data stored therein when power is not supplied.

The printing unit 113 prints on a print medium via a printing mechanism. The print medium is, for example, paper or the like.

In this embodiment, the printing unit 113 prints a character, using character font data.

In this embodiment, a case where the printing device 11 is a thermal printer having a thermal head and is a receipt printer printing a receipt is described. The printing device 11 may be a device of another type.

The print head 151 is a line thermal head in which a plurality of heat generation elements corresponding to resolution are arranged in a line along a direction intersecting the direction of conveyance of rolled paper. The print head 151 causes the heat generation elements to generate heat and thus forms dots on rolled paper that is thermal paper.

The cutter 152 has a fixed blade and a moving blade. The cutter 152 moves the moving blade relatively to the fixed blade so as to cross the fixed blade and the moving blade, and thus cuts rolled paper. The moving blade may be referred to as a first blade. The fixed blade may be referred to as a second blade.

The conveyor motor 153 rotates a conveyor roller, not illustrated, and thus conveys rolled paper accommodated in the casing of the printing device 11.

The printing unit 113 under the control of the control unit 111 prints a character or the like corresponding to a receipt onto rolled paper by the print head 151 while conveying the rolled paper by the conveyor motor 153, then cuts the rolled paper at a predetermined position by the cutter 152 and thus issues the receipt.

In the printing device 11, the control unit 111 stores data of a character code indicating a print target character into the RAM 133, subsequently stores the data into a predetermined print buffer, not illustrated, then sends the data to the print head 151, and thus performs print processing. However, in this embodiment, detailed description of this process is omitted.

The communication unit 114 under the control of the control unit 111 communicates with, for example, an external device such as a host computer controlling the print operation of the printing device 11, according to a predetermined communication standard. In this embodiment, the external device is the information processing device 12. That is, in this embodiment, the communication unit 114 communicates with the information processing device 12 via the line 13. The communication unit may be described as communication circuit, communication interface, or communication port.

The switch 115 is, for example, a DIP switch. The switch 115 is operated by a user, not illustrated, and is switched between two or more states. In this embodiment, the switch 115 has a state of designating a predetermined encoding scheme, as a state into which the switch 115 is switched.

In a specific example, the DIP switch is set into an on-state or an off-state by the user. When the power of the printing device 11 is turned on, or when the printing device 11 is reset, the control unit 111 reads the state of the DIP switch and configures settings corresponding to this state. For example, the on-state of the DIP switch is a state of designating a predetermined encoding scheme. The off-state of the DIP switch is a state of not designating a predetermined encoding scheme.

In this embodiment, for the sake of convenience of the description, it is assumed that the user of the information processing device 12 is the same as the user of the printing device 11. However, these users may be different.

Figure 3:
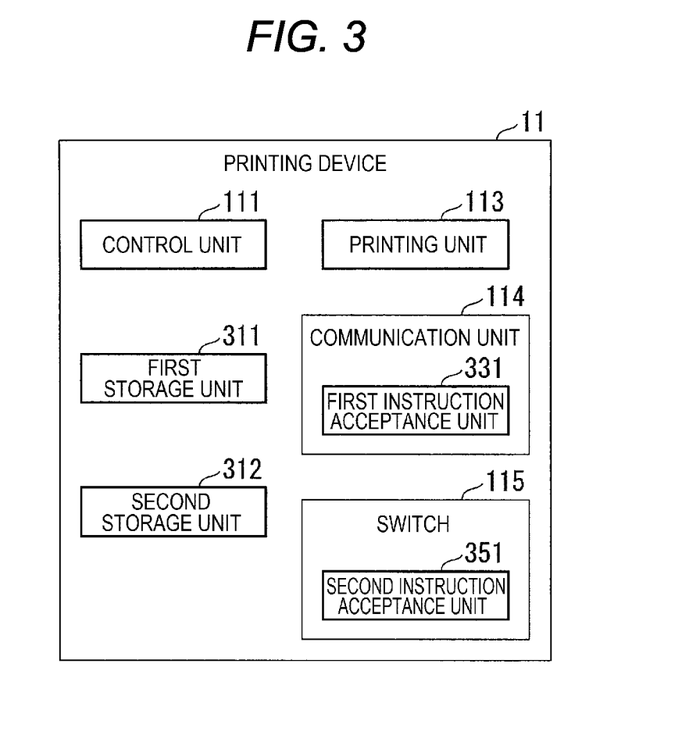
FIG. 3 shows an example of the functional configuration of a printing device 11 according the embodiment.

FIG. 3 shows an example of the functional configuration of the printing device 11 according to the embodiment.

The printing device 11 has the control unit 111, a first storage unit 311, a second storage unit 312, the printing unit 113, the communication unit 114, and the switch 115. In this embodiment, the first storage unit 311 is the non-volatile memory 112. In this embodiment, the second storage unit 312 is the RAM 133, which is a volatile memory.

The communication unit 114 has a first instruction acceptance unit 331.

The first instruction acceptance unit 331 accepts an instruction designating an encoding scheme, in terms of software. Specifically, in response to an encoding scheme designation command included in a signal received by the communication unit 114 from the external device, the first instruction acceptance unit 331 accepts an instruction designating the encoding scheme specified by the encoding scheme designation command. The encoding scheme designation command is a command in terms of software.

The first instruction acceptance unit 331 also accepts the foregoing print instruction in terms of software.

The first instruction acceptance unit 331 outputs the content of the accepted instruction to the control unit 111. The control unit 111 acquires the content of the instruction outputted from the first instruction acceptance unit 331. The functions of the first instruction acceptance unit 331 may be provided, for example, in the control unit 111.

The switch 115 has a second instruction acceptance unit 351.

The second instruction acceptance unit 351 accepts an instruction designating an encoding scheme, in terms of hardware. Specifically, according to the state into which the switch 115 is switched, the second instruction acceptance unit 351 accepts an instruction designating the encoding scheme specified by this state.

In this embodiment, the switch 115 outputs an encoding scheme designation command corresponding to the state into which the switch 115 is switched. In response to this encoding scheme designation command, the second instruction acceptance unit 351 accepts an instruction designating the encoding scheme specified by the encoding scheme designation command.

The second instruction acceptance unit 351 outputs the content of the accepted instruction to the control unit 111. The control unit 111 acquires the content of the instruction outputted from the second instruction acceptance unit 351. The functions of the second instruction acceptance unit 351 may be provided, for example, in the control unit 111.

In this embodiment, for the sake of convenience of the description, a case where both the first instruction acceptance unit 331 and the second instruction acceptance unit 351 are provided in the printing device 11 is described. However, in another configuration example, a configuration where only one of the first instruction acceptance unit 331 and the second instruction acceptance unit 351 is provided in the printing device 11 may be used.

The control unit 111 selects an encoding scheme used by the printing device 11, based on an instruction designating an encoding scheme accepted by the first instruction acceptance unit 331. That is, the control unit 111 can select the encoding scheme designated by the instruction, as the encoding scheme used for printing. In the description below, for the sake of convenience of the description, the encoding scheme selected by the control unit 111 is referred to as a selected encoding scheme. For example, when the encoding scheme selected by the control unit 111 is the 1-byte character encoding scheme, the selected encoding scheme is the 1-byte character encoding scheme. Also, for example, when the encoding scheme selected by the control unit 111 is the 2-byte character encoding scheme, the selected encoding scheme is the 2-byte character encoding scheme. Meanwhile, for example, when the encoding scheme selected by the control unit 111 is Unicode, the selected encoding scheme is Unicode.

When Unicode is selected as the selected encoding scheme and the control unit 111 has accepted a print instruction including a code point indicating a multiple-form character, the control unit 111 performs the following processing. That is, in this case, the control unit 111 causes the printing unit 113 to print the multiple-form character indicated by the code point included in the data of the accepted print instruction, based on the priority level allocated to each of a plurality of font designs of the multiple-form character. More specifically, in this case, the control unit 111 causes the printing unit 113 to print the multiple-form character indicated by the code point included in the data of the accepted print instruction, with the font design having the highest priority of the plurality of font designs of the multiple-form character.

Also, in response to a level change command that is accepted or an operation that is accepted, the control unit 111 also changes the priority level of a font design indicated by the level change command, of all the font designs that are available in the printing device 11, to the priority level indicated by the level change command. The level change command is a command indicating a font design that is a part of all the font designs that are available in the printing device 11 and a command indicating the priority level of each of one or more font designs indicated by this command. Thus, the printing device 11 can easily change the priority level of each of a plurality of font designs. In the description below, an example case where the level change command is a command indicating one font design of all the font designs that are available in the printing device 11 and a command indicating the priority level of the one font design indicated by this command, is described.

Processing carried out by such a control unit 111 on accepting a level change command will be described in detail below.

Processing Carried Out by Control Unit on Accepting Level Change Command

Figure 4:
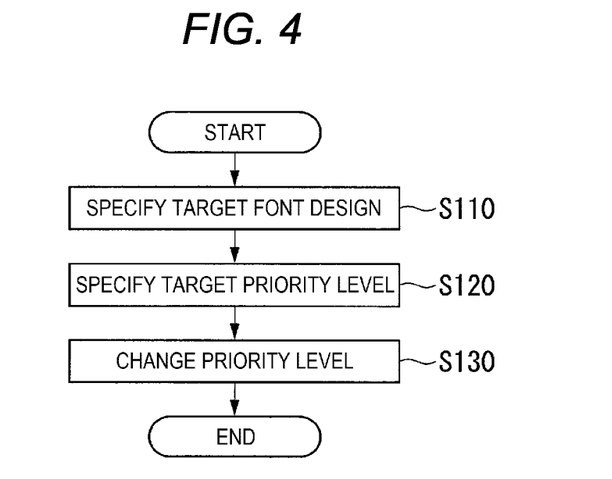
FIG. 4 shows an example of a flow of processing carried out when a control unit 111 accepts a level change command.

The processing carried out by the control unit 111 on accepting a level change command will now be described with reference to FIG. 4. FIG. 4 shows an example of the flow of the processing carried out by the control unit 111 on accepting a level change command. In the description below, an example case where the printing device 11 accepts a level change command from the information processing device 12 at a timing before the processing in step S110 shown in FIG. 4 is carried out, is described. Also, in the description below, a case where the selected encoding scheme is Unicode is described.

The control unit 111 specifies a target font design, based on a level change command that is accepted in advance (step S110). The target font design is a font design indicated by the level change command. The processing in step S110 will now be described.

The level change command accepted by the printing device 11 from the information processing device 12 is, for example, a command having the following expression (1):

$$FS(C\ pL\ pH\ fn\ m\ a) \qquad (1).$$

FS in the command having the above expression (1) is a variable indicating that this is a command. C in the command is a variable indicating that the command is a command for setting a parameter. pL and pH in the command are variables indicating the data size of the three variables, fn, m, and a in the command, that is, the number of bytes thereof. pL indicates the number of lower bytes. pH indicates the number of higher bytes. fn in the command indicates a function number. m in the command is a variable designating a priority level of a desired font design that the user wants to change in priority level. a in the command is a variable designating a desired font design that the user wants to change in priority level. In the description below, for the sake of convenience of the description, this command is referred to as a command FS.

When, for example, the control unit 111 has accepted the command FS, the control unit 111 specifies a font design designated by the variable a included in the command FS, as a target font design. In this way, the control unit 111 in step S110 specifies the target font design, based on the level change command that is accepted in advance.

After performing the processing in step S110, the control unit 111 specifies a priority level desired by the user as the priority level of the target font design, based on the level change command that is accepted in advance, as a target priority level (step S120). When, for example, the control unit 111 has accepted the command FS, the control unit 111 specifies a priority level designated by the variable m included in the command FS, as the target priority level. In this way, the control unit 111 in step S120 specifies the target priority level, based on the level change command that is accepted in advance.

The control unit 111 may perform the processing in step S110 and the processing in step S120 in the reverse order or in parallel.

After performing the processing in step S120, the control unit 111 changes the priority level of the target font design to the target priority level (step S130). The processing in step S130 will now be described.

Figure 5:
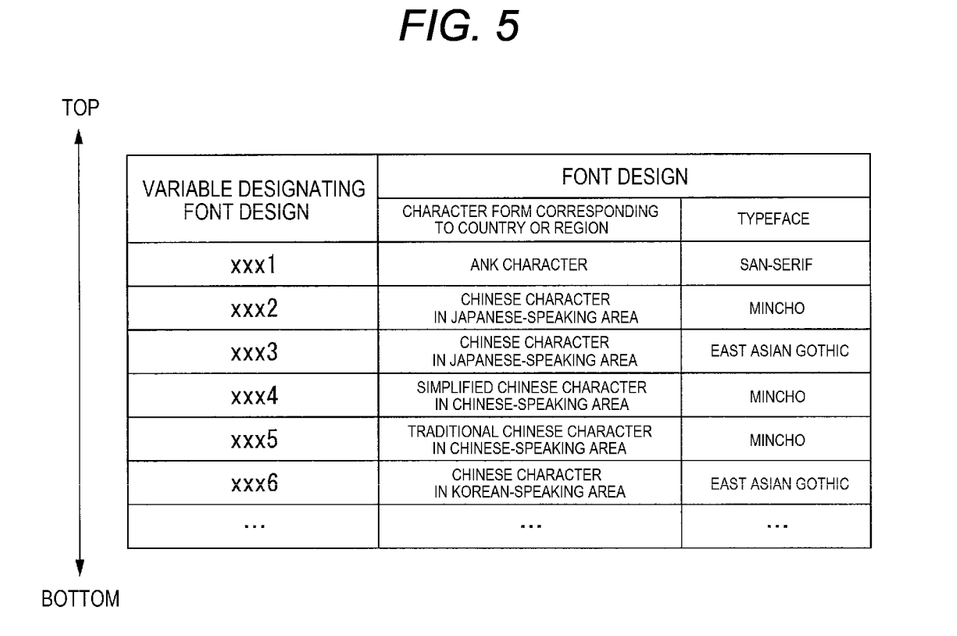
FIG. 5 shows an example of a priority level allocated by default to each of all the font designs that are available in the printing device 11.

FIG. 5 shows an example of the priority level allocated by default to each of all the font designs that are available in the printing device 11. The arrows shown in FIG. 5 indicate the top and bottom in FIG. 5. In the example shown in FIG. 5, at least six font designs are available in the printing device 11. In this example, the six font designs include the ANK character in the san-serif typeface, the Chinese character in the Mincho typeface in the Japanese-speaking area, the Chinese character in the East Asian Gothic typeface in the Japanese-speaking area, the simplified Chinese character in the Mincho typeface in the Chinese-speaking area, the traditional Chinese character in the Mincho typeface in the Chinese-speaking area, and the Chinese character in the East Asian Gothic typeface in the Korean-speaking area. Also, in this example, the ANK character in the san-serif typeface is designated by a variable "xxx1". In this example, the Chinese character in the Mincho typeface in the Japanese-speaking area is designated by a variable "xxx2". In this example, the Chinese character in the East Asian Gothic typeface in the Japanese-speaking area is designated by a variable "xxx3". In this example, the simplified Chinese character in the Mincho typeface in the Chinese-speaking area is designated by a variable "xxx4". In this example, the traditional Chinese character in the Mincho typeface in the Chinese-speaking area is designated by a variable "xxx5". In this example, the Chinese character in the East Asian Gothic typeface in the Korean-speaking area is designated by a variable "xxx6". In the table shown in FIG. 5, the order in which the plurality of font designs are arranged from the top to the bottom represents the priority levels of the plurality of font designs. That is, in this example, the priority level of the ANK character in the san-serif typeface is 1. In this example, the priority level of the simplified Chinese character in the Mincho typeface in the Chinese-speaking area is 4. In the description below, for the sake of convenience of the description, the table shown in FIG. 5 is referred to as a priority level table.

Figure 6:
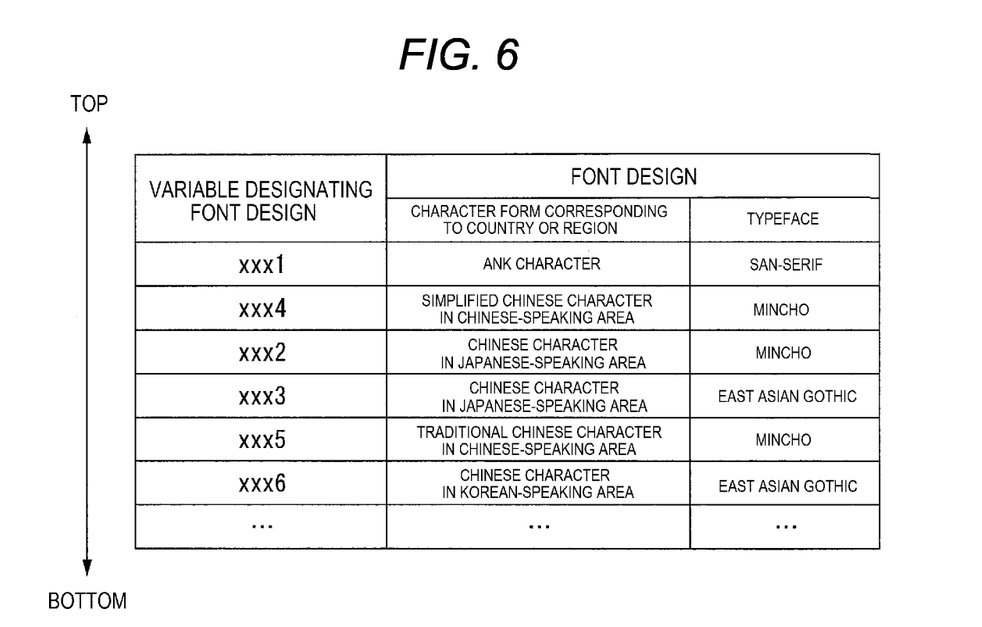
FIG. 6 shows an example of a priority level table after the control unit 111 changes the priority level in response to a level change command.

In this example, when the target font design specified in step S110 is the font design designated by the variable "xxx4" and the target priority level specified in step S120 is 2, the control unit 111 changes the priority levels of the font designs shown in FIG. 5 to the priority levels of the font designs shown in FIG. 6. FIG. 6 shows an example of the priority level table after the control unit 111 changes the priority levels in response to a level change command. In this case, the control unit 111 changes the priority level of the simplified Chinese character in the Mincho typeface in the Chinese-speaking area from 4 to 2 as the target font design, as shown in FIG. 6. At this time, the control unit 111 lowers the priority level of the Chinese character in the Mincho typeface in the Japanese-speaking area, which is 2 before the change of priority levels, to 3, and lowers the priority level of the Chinese character in the East Asian Gothic typeface in the Japanese-speaking area, which is 3 before the change of priority levels, to 4. The control unit 111 holds the priority level of the traditional Chinese character in the Mincho typeface in the Chinese-speaking area, which is 5 before the change of priority levels, unchanged at 5, and holds the priority level of the Chinese character in the East Asian Gothic typeface in the Korean-speaking area, which is 6 before the change of priority levels, unchanged at 6. That is, in this case, the control unit 111 raises the priority level of the target font design before the change of priority levels, to the target priority level. In this case, the control unit 111 lowers, by one level, the priority level of each of one or more font designs from the font design having the priority level immediately below the target priority level to the font design having the priority level immediately above the priority level of the target font design before the change of priority levels. Thus, the printing device 11 can easily change the priority level of each of a plurality of font designs. For example, even when the user of the printing device 11 does not grasp types of font designs that are available in the printing device 11, the printing device 11 can change the priority level of a font design desired by the user to a desired priority level. In other words, even when the user of the printing device 11 does not have knowledge about the priority levels of other font designs than the font design corresponding to the country or region where the user lives, the user can easily change the priority level of the font design corresponding to the country or region where the user lives, to a desired priority level. Since the printing device 11 changes the priority level of a font design in this way, the printing device 11 has no problem in changing the priority level of a font design desired by the user via a level change command to a desired priority level even when available types of font designs are increased. For example, when types of font designs that are available in the related-art printing device that allocates a priority level to each of available font designs at a time are increased, the related-art printing device may not be able to recognize a command used before available types of font designs are increased. The printing device 11 has no such problems and therefore can improve user-friendliness with respect to changing the priority levels of font designs that are available in the printing device 11.

In the processing in step S130, the control unit 111 may lower the priority level of the target font design, instead of raising the priority level, based on the level change command. That is, in the printing device 11, the target priority level may be lower than the priority level of the target font design.

After performing the processing in step S130, the control unit 111 ends the processing.

The control unit 111 may perform the processing in the flowchart shown in FIG. 4 when the selected encoding scheme is another encoding scheme than Unicode. However, in this case, the encoding scheme is an encoding scheme in which a multiple-form character is indicated by one character code, of other encoding schemes than Unicode.

Figure 7:
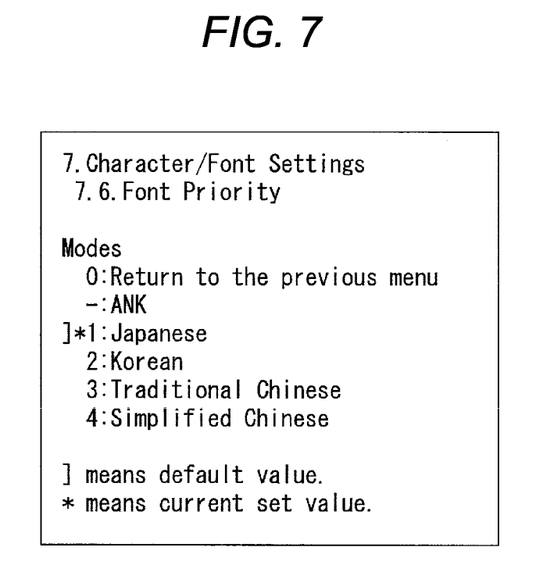
FIG. 7 shows an example of a printed matter on which information representing the priority level allocated to each of a plurality of font designs that are available in the printing device 11 is printed.

Also, the processing in the flowchart shown in FIG. 4 may be performed based on an operation accepted from the user, instead of the level change command. In this case, the printing device 11 has a hardware key such as a switch or button accepting an operation from the user, a display showing a software key accepting an operation from the user, or the like. In this case, the printing device 11 prints a printed matter where information representing the priority level allocated to each of a plurality of font designs that are available in the printing device 11 is printed, in the process of accepting an operation of changing the priority levels of font designs from the user. FIG. 7 shows an example of the printed matter where information representing the priority level allocated to each of a plurality of font designs that are available in the printing device 11 is printed. The printing device 11 prints a printed matter as shown in FIG. 7, every time the printing device 11 accepts an operation from the user in this process. In the example shown in FIG. 7, the Chinese character in the Japanese-speaking area is represented as "Japanese" and the priority level 1 is allocated thereto. In this example, the Chinese character in the Korean-speaking area is represented as "Korean" and the priority level 2 is allocated thereto. In this example, the traditional Chinese character in the Chinese-speaking area is represented as "Traditional Chinese" and the priority level 3 is allocated thereto. In this example, the simplified Chinese character in the Chinese-speaking area is represented as "Simplified Chinese" and the priority level 4 is allocated thereto.

As described above, a printing device according to an embodiment has: a printing unit performing printing; and a control unit that, when accepting a character code associated with a plurality of font designs, causes the printing unit to print a character indicated by the character code, based on a priority level allocated to each of the plurality of font designs. The control unit changes the priority level of the plurality of font designs in response to a first command that is accepted. The first command is a command indicating the priority level of the font design that is a part of the plurality of font designs. Thus, the printing device can easily change the priority level of each of a plurality of font designs. In the foregoing example, the printing device 11 is an example of the printing device. In the foregoing example, the printing unit 113 is an example of the printing unit. In the foregoing example, the combination of a character form and a typeface corresponding to the country or region is an example of the font design. In the foregoing example, the control unit 111 is an example of the control unit. In the foregoing example, the code point is an example of the character code. In the foregoing example, the level change command is an example of the first command.

In the printing device, an encoding scheme for the character code may be Unicode.

In the printing device, the font design may be one of a character form, a typeface, and a combination of the character form and the typeface.

In the printing device, the font design may be the character form or the combination of the character form and the typeface. The plurality of character forms may include a character form associated with each of two or more languages.

In the printing device, the first command may be a command indicating the priority level of one font design of the plurality of font designs.

An embodiment of the present disclosure has been described in detail with reference to the drawings. However, the present disclosure is not limited to the specific configurations in the embodiment. Change, replacement, deletion or the like can be made without departing from the spirit and scope of the present disclosure.

A program to implement a function of any component of the above device may be recorded in a computer-readable recording medium, and a computer system may read and execute the program. The device in this case is, for example, the printing device 11, the information processing device 12 or the like. The "computer system" in this case includes an OS (operating system) and hardware such as a peripheral device. The "computer-readable recording medium" refers to a portable medium such as a flexible disk, magneto-optical disk, ROM, or CD-ROM (compact disk ROM), or a storage device such as a hard disk built in the computer system. The "computer-readable recording medium" also includes a medium holding the program for a predetermined time, such as a volatile memory in a computer system that serves as a server or client when the program is transmitted via a network such as the internet or via a communication line such as a telephone line.

The program may be transmitted from a computer system storing this program in a storage device or the like to another computer system via a transmission medium or via a transmission wave in a transmission medium. The "transmission medium" transmitting the program in this case refers to a medium having the function of transmitting information, like a network such as the internet or like a communication line such as a telephone line.

The program may also be configured to implement a part of the foregoing functions. The program may also be a program that can implement the foregoing functions when combined with a program already recorded in the computer system, that is, a so-called difference file or difference program.

What is claimed is:

1. A printing device comprising:
   a print mechanism;
   a memory storing a plurality of font designs, the plurality of font designs being previously stored in the memory; and
   a controller that, in response to accepting a character code associated with the plurality of font designs, causes the print mechanism to print a character indicated by the character code, based on a priority level allocated to each of the plurality of font designs stored in the memory, wherein:
   the controller changes the priority level of the plurality of font designs in response to accepting a first command,
   the first command is a command indicating the priority level of the font design that is a part of the plurality of font designs,
   each of the plurality of font designs is a combination of (1) a character form corresponding to a country or a region, and (2) a typeface,
   the controller changes the priority level of the plurality of font designs in response to accepting a user operation to the printing device, and
   the controller causes the print mechanism to print information indicating the priority level changed by the user operation.

2. The printing device according to claim 1, wherein an encoding scheme for the character code is Unicode.

3. The printing device according to claim 1, wherein the font design is the character form or the combination of the character form and the typeface, and
   the plurality of character forms include a character form associated with each of two or more languages.

4. The printing device according to claim 1, wherein the first command is a command indicating the priority level of one font design of the plurality of font designs.

5. The printing device according to claim 1, wherein:
the controller accepts the character code associated with a subset of the plurality of font designs, and
the first command is a command indicating the priority level of the font design that is a part of the subset of the plurality of font designs.

6. A control method for a printing device, the method comprising:
in response to accepting a character code associated with a plurality of font designs stored in a memory of the printing device, causing a print mechanism performing printing to print a character indicated by the character code, based on a priority level allocated to each of the plurality of font designs, the plurality of font designs being previously stored in the memory; and
changing the priority level of the plurality of font designs in response to accepting a first command,
the first command being a command indicating the priority level of the font design that is a part of the plurality of font designs,
each of the plurality of font designs being a combination of (1) a character form corresponding to a country or a region, and (2) a typeface,
changing the priority level of the plurality of font designs on response to accepting a user operation to the printing device, and
causing the print mechanism to print information indicating the priority level changed by the user operation.

\* \* \* \* \*